United States Patent [19]

Kawaguchi

[11] Patent Number: 5,593,241

[45] Date of Patent: Jan. 14, 1997

[54] RELEASING SHEET

[75] Inventor: Takashi Kawaguchi, Aichi-ken, Japan

[73] Assignee: Brother Kogyo Kabushiki Kaisha, Nagoya, Japan

[21] Appl. No.: 529,442

[22] Filed: Sep. 18, 1995

[30] Foreign Application Priority Data

Oct. 3, 1994 [JP] Japan .................................. 6-238923

[51] Int. Cl.$^6$ .................................................. B41J 15/06
[52] U.S. Cl. ........................ 400/613; 428/202; 428/41.8; 101/288
[58] Field of Search ..................................... 400/208, 207, 400/613; 428/40, 42, 202; 101/288

[56] References Cited

U.S. PATENT DOCUMENTS

| 4,983,058 | 1/1991 | Nagae | 400/249 |
| 5,418,026 | 5/1995 | Dronzek, Jr. et al. | 428/40 |
| 5,468,081 | 11/1995 | Cane et al. | 400/621 |

*Primary Examiner*—Ren Yan
*Attorney, Agent, or Firm*—Oliff & Berridge

[57] ABSTRACT

An antistatic releasing sheet for use with adhesive tapes or sheets includes a separation layer formed on a paper backing mixed with conductive filler. A colored layer, such as a white pigment, may be formed between the paper backing and the separation layer.

20 Claims, 5 Drawing Sheets

RELEASING SHEET

BACKGROUND OF THE INVENTION

1. Field of the Invention

The present invention relates to a releasing sheet that is applied to the adhesive portions of adhesive labels or sheets.

2. Description of Related Art

Adhesive labels or sheets, made by applying an adhesive to a first side of a label or sheet backing, are known in the art. The second side of the label or sheet has a printing surface, and a releasing sheet is usually attached to the adhesive side to temporarily cover the adhesive.

Such adhesive labels or sheets may be used with word processors or typewriters to produce labels for files and the like. Desired characters and figures are printed on the printing surface of the label, for instance by a printer connected to a personal computer, the printed adhesive label or sheet is cut to a desired size and shape, and the labels are adhered to objects such as files by peeling off the releasing sheet and pressing the adhesive side of the label against the object.

One known apparatus for producing such labels is disclosed in U.S. Pat. No. 4,983,058. This apparatus laminates together a transparent film tape, with characters or the like printed thereon, and a double-sided elongated adhesive tape having a releasing sheet.

As shown in FIG. 3, the tape printer includes a tape printing unit 20 having a thermal head 21, and a tape cassette 22 that is removably mounted on the tape printing unit 20. In FIG. 3, the tape cassette 22 is shown without its top cover.

The tape cassette 22 houses a tape spool 24, around which a transparent film tape 23 is wound, a ribbon supply spool 26, around which a thermal transfer ribbon 25 is wound with its ink surface facing inward, a ribbon take-up spool 27 for taking up the thermal transfer ribbon 25 withdrawn from the ribbon supply spool 26, a double-sided adhesive tape spool 29, around which is wound a double-sided adhesive tape 28 having substantially the same width as that of the transparent film tape 23 and a releasing sheet adhered to the outward facing side, and an alignment roller 30 for aligning the double-sided adhesive tape 28 with the transparent film tape 23. Each of the above spools is rotatably supported between the top cover (not shown) and a support section (not shown) of the tape cassette.

The thermal head 21 can be inserted into an indented section 31 formed on the tape cassette 22. Moreover, a feed roller 33 and a platen roller 34 which are provided on a support body 32 that is rotatably supported on the tape printing unit 20. The platen roller 34 and feed roller 33 are arranged opposite to the thermal head 21 and the alignment roller 30, respectively. The support body 32 is urged against the tape cassette 22 by an urging member (not shown). The platen roller 34 is pressed against the thermal head 21, whereas the feed roller 33 is pressed against the alignment roller 30.

In the tape printing unit 20 having the above-described construction, the thermal head 21 commences print control upon the depression of a print key (not shown) after desired characters have been input. When the print control starts, the transparent film tape 23 is withdrawn from the spool 24 and fed to the thermal head 21 and the platen roller 34 by means of the alignment roller 30 and the feed roller 33. At the same time, the thermal transfer ribbon 25 is withdrawn from the ribbon supply spool 26 and fed toward the thermal head 21 and the platen roller 34 at the same speed as the transparent film tape 23.

Characters or the like are then printed on the transparent film tape 23 via the thermal transfer ribbon 25 and the thermal head 21 in synchronism with the feeding operation of the transparent film tape 23 and the thermal transfer ribbon 25. The printed film tape 23 is then fed to the alignment roller 30 and the feed roller 33. The double-sided adhesive tape 28 is withdrawn from the double-sided adhesive tape spool 29 by the cooperative action of the alignment roller 30 and the feed roller 33. At this time, a first adhesive surface of the double-sided adhesive tape 28 is aligned with and affixed to the printed surface of the transparent film tape 23. In this way, an adhesive label P is prepared.

However, when printing is carried out using the above described tape printer, the alignment roller 30 and the releasing sheet of the double-sided adhesive tape 28 come into contact with each other. Similarly, when an adhesive label or sheet, as described above, is printed using a typewriter, word processor or a printer, the releasing sheet of the adhesive label or sheet comes into contact with various members such as a platen and feed rollers which are disposed in a traveling path of the typewriter, word processor or printer.

If the releasing sheet of the adhesive labels or tapes described above have a significantly different electrostatic charge pattern than the platen or feed rollers, the probability that static electricity will be generated on the releasing sheet is high. Particularly, if a so-called transfer coating method is employed to form the adhesive labels or tapes. The development of static electricity becomes even more likely during low temperature and low humidity conditions.

In a transfer coating method, an adhesive is first applied to a releasing sheet, the coated sheet is dried, and the dried coated releasing sheet is affixed to a label or tape backing. In such a process, moisture contained in the releasing sheet will be significantly decreased during the drying step as a result of evaporation. This will, in turn, considerably increase the probability of generation of static electricity.

The static electricity generated during the printing tends to cause the adhesive label or tape to adhere to the platen, the feed roller, or the like. As a result, the adhesive label or tape may get caught up in the platen or the feed roller. If this happens, feeding of the label or tape may be affected, and misprinting may occur. It will become impossible to decipher the printed characters or figures due to a deficiency in feed rate. Further, when the printed adhesive label or tape adheres to the printer or the like due to static electricity, handling of the adhesive sheet or label becomes extremely troublesome. Additionally, the resulting charged adhesive label or sheet attracts dirt or dust.

When a rolled double-sided adhesive tape is subjected to continuous printing, as described above, static electricity may sometime accumulate on the tape printer. In the worst case, the accumulated static electricity discharges, resulting in adverse effects such as malfunctioning of electronic components within the tape printer.

SUMMARY OF THE INVENTION

The present invention is aimed at solving the above-mentioned problems, and providing a releasing sheet which does not lose its antistatic properties when it passes through a dryer during an adhesive coating process, or when it is stored for long periods of time in extremely dry conditions.

To solve the above listed problems, a releasing sheet embodying the present invention includes a paper backing that is mixed with a conductive filler, and a separation layer that is formed on the paper backing. The conductive filler may comprise metal powder, conductive carbon black, or any other similar substance. A releasing sheet embodying the invention may also include a coloring layer, such as a white pigment, formed between the paper backing and the separation layer. A releasing sheet embodying the invention may also be given an antistatic treatment.

The surface electrical resistance of the paper backing on which the separation layer is not formed should preferably be less than $1.0 \times 10^{12} \Omega$.

Adhesive labels or tapes that utilize a releasing sheet embodying the invention prevent the generation of static electricity. Moreover, by virtue of the conductivity of the releasing sheet, sufficient antistatic effects will be retained by the releasing sheet, even if the adhesive labels or tapes are stored for long periods of time in an extremely intense high temperature environment or a low temperature and low humidity environment.

If a coloring layer, such as a white pigment, is formed between the paper backing and the separation layer, the releasing sheet will appear white, as viewed from the separation layer. Thus, when the releasing sheet of the present invention is attached to a printed transparent label or tape that has letters and figures printed thereon, it will be easy to see the characters and figures against the colored background.

DETAILED DESCRIPTION OF THE PREFERRED EMBODIMENTS

A preferred embodiment of the present invention will now be explained with reference to the drawings.

Figure 1:
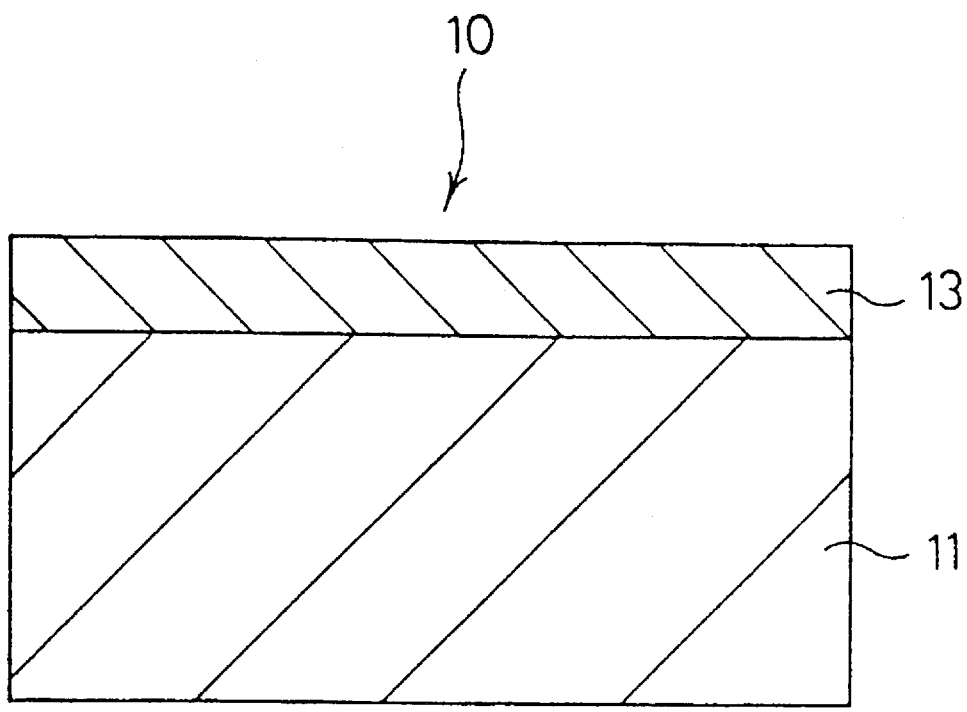
FIG. 1 is a sectional view showing the construction of an antistatic releasing sheet embodying the present invention.
Figure 2:
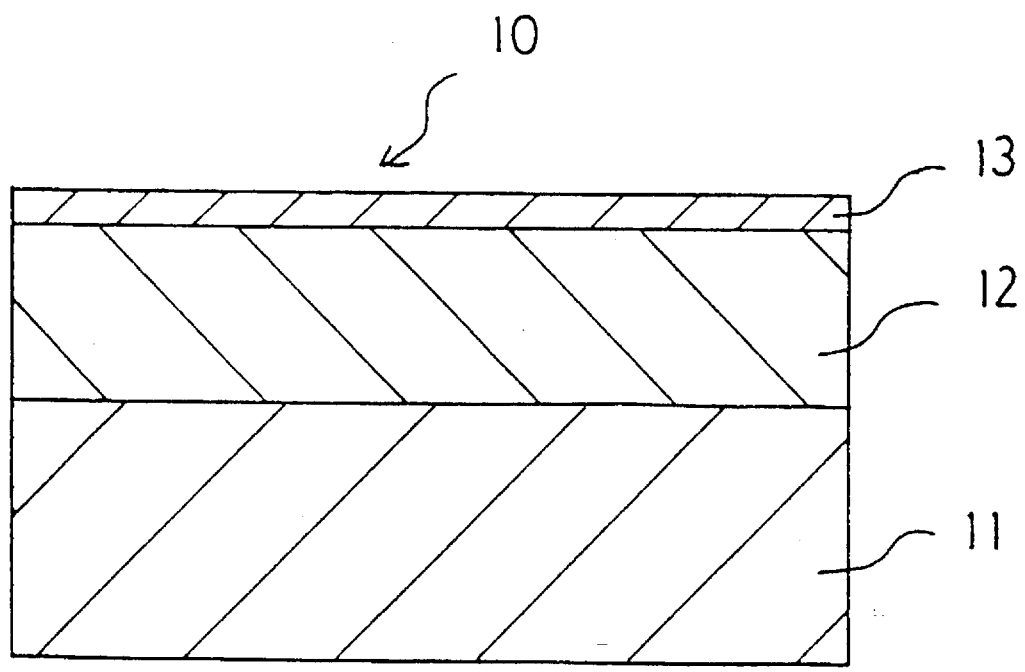
FIG. 2 is a sectional view of another antistatic releasing sheet embodying the invention.

The structure of antistatic releasing sheets that embody the invention are shown in FIGS. 1 and 2. The releasing sheet 10 shown in FIG. 1 comprises a paper backing 11 that is mixed with a conductive filler, and a separation layer 13. In alternative embodiments of the invention, a colored layer 12 may be provided between the paper backing 11 and the separation layer 13.

Any paper is acceptable as the paper backing 11 so long as it is mixed with a conductive filler. For example, normal high quality paper, or glassine paper, could be used to form a releasing sheet embodying the invention.

Suitable conductive fillers include metal powder such as conductive carbon black, graphite, gold, platinum, silver, nickel, copper, aluminum, zinc, iron or palladium. Conductive carbon black is one preferred conductive filler.

The separation layer 13 may be formed from a coating of a silicone resin or other similar or equivalent substance having an ordinary releasing property. The separation layer 13 may be formed either directly on the paper backing 11, as shown in FIG. 1, or on an intervening colored layer 12, as shown in FIG. 2, employing any known coating system.

The colored layer 12 may be formed on the paper backing 11 by coating the paper backing 11 with a paint which includes a color pigment, or by carrying out known extrusion lamination process using a resin mixed with a color pigment. The formation of the colored layer 12 on the paper backing 11 makes the separation layer 13 side appear colored. The colored layer 12 ensures that when a printed transparent label is attached to the separation layer 13 via an adhesive layer, characters and figures on the transparent label are easy to identify.

If the color pigment is intended to be white, the pigment may comprise metal oxides of titanium, aluminum, zinc, zirconium or magnesium, or the oxide may comprise calcium carbonate, barium sulfate, talc, clay, bentonite, or the like. In terms of opaqueness, titanium oxide is more desirable. Of course, colors other than white could be used.

Desirable examples of a resin suitable for use in a lamination process are polyethylene, polypropylene, ionomer, an ethylene-vinyl acetate copolymer, an ethylene-ethyl acrylate copolymer, an ethylene acrylate copolymer, nylon, polyester, or the like. Among these polyethylene is preferred.

Figure 3:
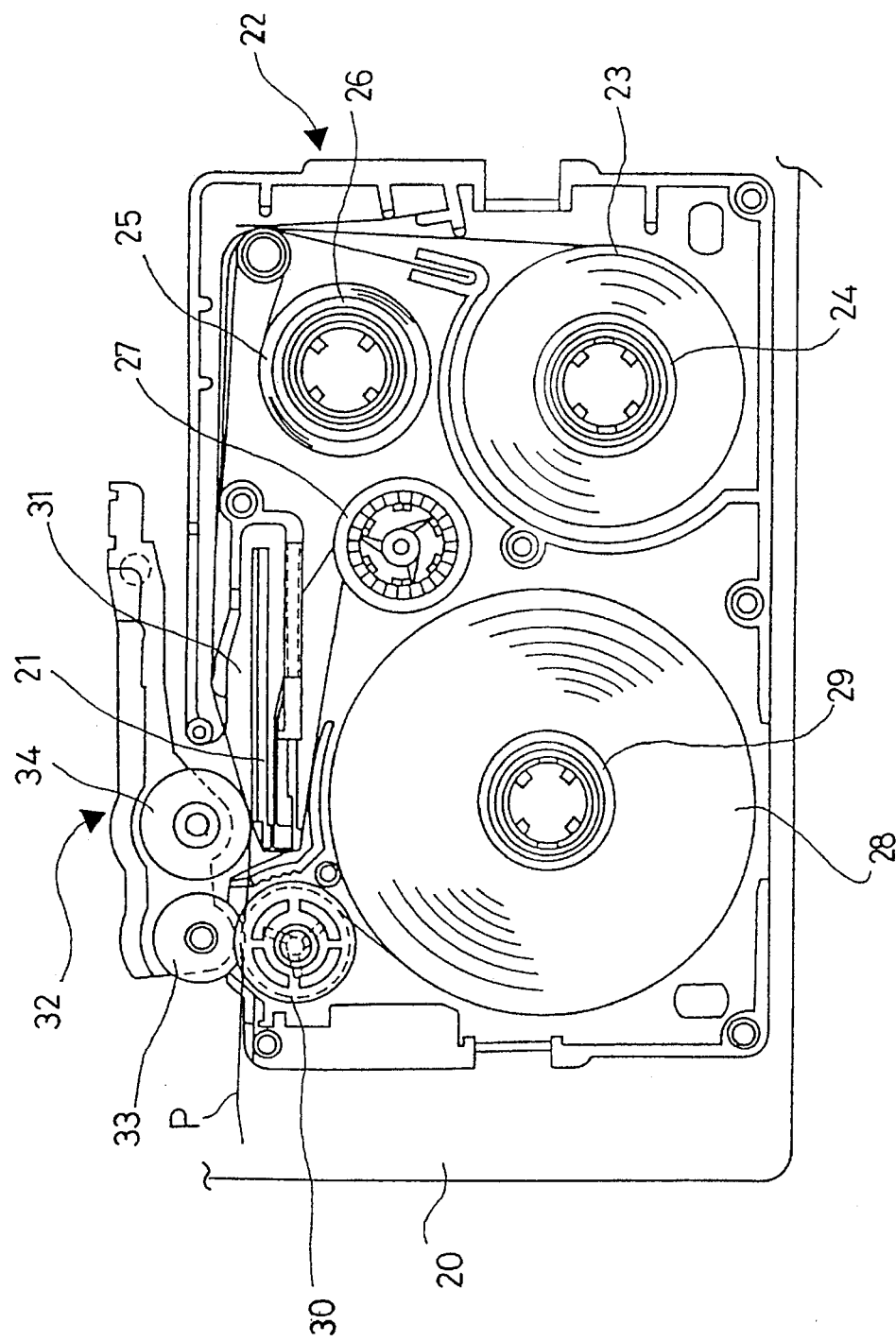
FIG. 3 is a schematic view showing the construction of a tape printer.

An antistatic releasing sheet 10 having any of the above described constructions may be affixed to one surface of a double-sided adhesive tape 28, as shown in FIG. 3. In this case, although the antistatic releasing sheet 10 is kept in contact with the alignment roller 30, the conductive filler mixed in the paper backing 11 prevents the buildup of an electrical charge due to static electricity. Accordingly, malfunctions resulting from a discharge of static electricity do not arise in the tape printer 20. Similarly, when an adhesive label or sheet utilizing an antistatic releasing sheet embodying the invention is used in a word processor or printer, the conductive filler in the paper backing prevents the buildup of an electrical charge due to contact with a platen or feed rollers disposed in the traveling path of the word processor or printer

EXAMPLE 1

Figure 4:
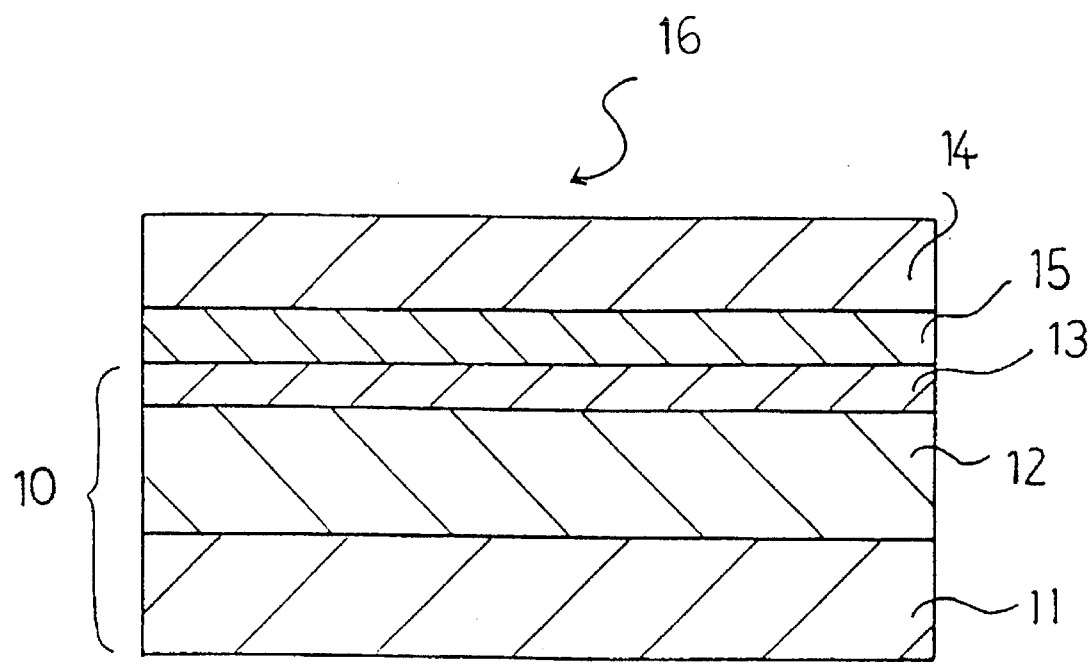
FIG. 4 is a sectional view of a heat sensitive label utilizing an antistatic releasing sheet embodying the inventions.

A colored label 16 utilizing an antistatic releasing sheet 10 embodying the invention was constructed as shown in FIG. 4. The colored label 16 was formed by applying a colored layer 12 to a paper backing 11 mixed with conductive carbon black. A separation layer 13 was then formed on the colored layer 12 by applying a silicone resin to the colored layer 12. The antistatic releasing sheet 10 was then laminated to a film 14 that was coated with a heat sensitive coloring agent (which is normally transparent but which turns black when heated) using an adhesive layer 15. The resulting colored label 16 was then dried at a temperature of about 100° C. The surface electrical resistance of the paper backing 11 was $1.0 \times 10^{12} \Omega$.

This heat sensitive colored label 16 was kept in an environment of 5° C. and 10% Rh (Relative humidity) for more than 48 hours. Thereafter, a printing test was carried out in a thermal transfer printer. Absolutely no generation of static electricity was observed on the label, and the label was sufficiently fed without becoming attracted to the feed rollers or the platen due to static electricity. Feeding never became impracticable. Further, the thermal transfer printer could carry out printing without the occurrence of malfunctions due to electrical discharges from the buildup of static electricity.

Thus, it would appear that if the surface electrical resistance of the paper backing is less than $1.0 \times 10^{12} \Omega$, various problems caused by the generation of static electricity will not arise.

Although the heat sensitive label used in the experiment was colorless and transparent, it was easy to identify black characters and figures printed on the label because of the colored layer 12 provided between the black antistatic releasing sheet 10 and the separation layer 13.

COMPARATIVE EXAMPLE 1

Using ordinary high quality paper without a conductive filler as the paper backing, three types of heat sensitive colored labels were prepared in a manner similar to the one described above in Example 1. The labels were dried at a temperature of about 100° C. The surface electrical resistance of the high quality paper used for these heat sensitive colored labels were set to $1.0 \times 10^{13}$, $1.0 \times 10^{15}$, and $1.0 \times 10^{17} \Omega$, respectively.

The labels were kept in an environment of 5° C. and 10% Rh for a period of more than 48 hours, and a printing test was carried out using a thermal transfer printer. All three of the colored labels generated static electricity during printing. As a result, the labels were attracted to the feed rollers and the platen in the thermal transfer printer. Poor traveling properties such as a lowered feed rate and impracticable feeding were observed. Accordingly, the letters and figures printed on the labels were remarkably impaired.

A releasing sheet embodying the present invention may be attached to a double-sided adhesive tape 28 and used on the spool 29 of the tape cassette 22 shown in FIG. 3. In such a printer, the double-sided adhesive tape 28 and the transparent film tape 23 are press-fitted by the alignment roller 30 and the feed roller 33.

Figure 5:
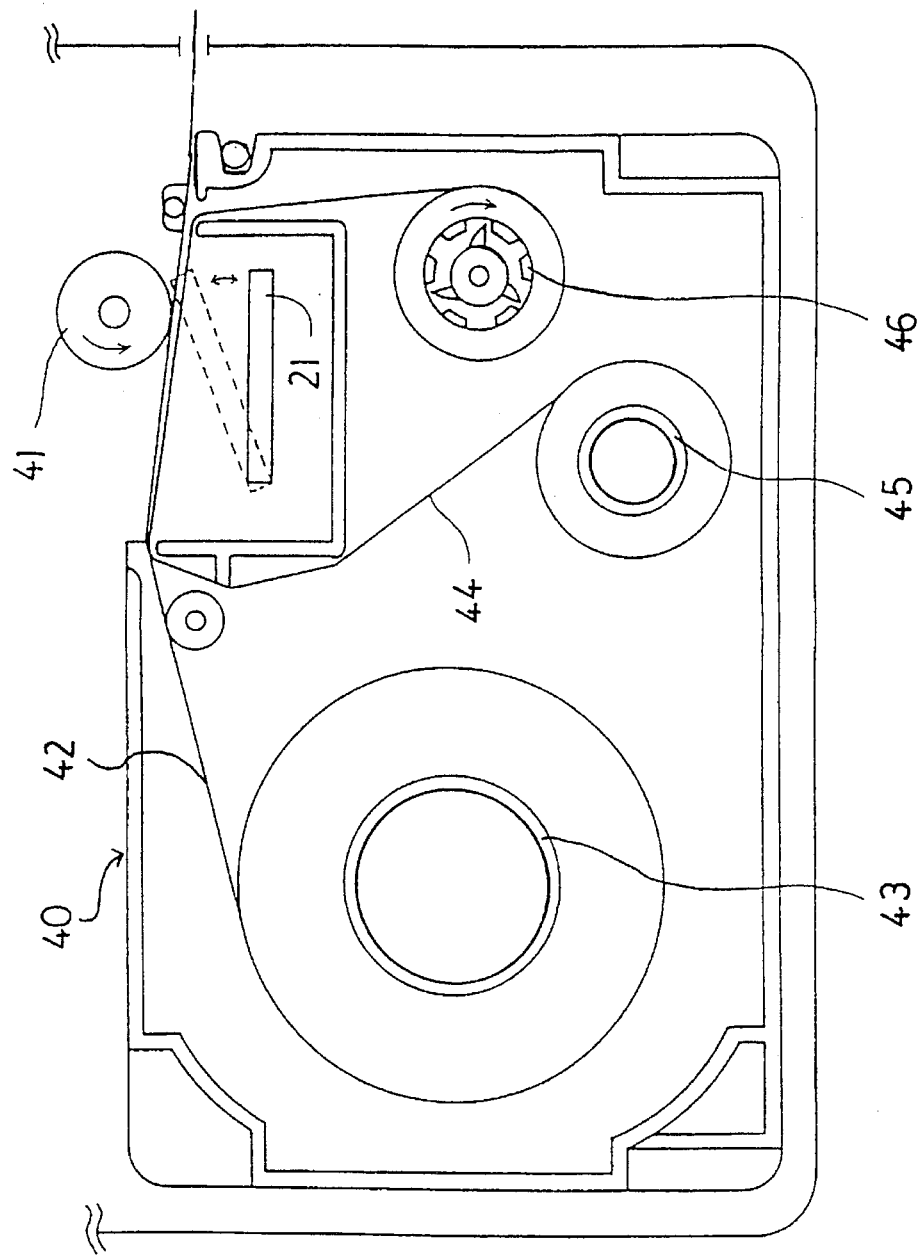
FIG. 5 is a schematic view showing a tape cassette housing a label that utilizes an antistatic releasing sheet embodying the invention mounted on a printer.

A releasing sheet embodying the present invention may also be used in the printer and cassette shown in FIG. 5. In this type of printer, the releasing sheet is bonded to a film tape, and the combined releasing sheet and film tape is wound, as a print tape 42, around a tape spool 43, with the releasing sheet facing outside. An ink ribbon 44 is wound around an ink ribbon feed spool 45. A take-up spool 46 takes up the ink ribbon. In this system, the print tape 42 and the ink ribbon 44 are superimposed, and printing is carried out by the thermal head 21 on the platen roller 41.

As previously mentioned, the releasing sheet of the present invention has an antistatic effect by virtue of the conductive filler mixed in the paper backing. As a result, when a tape that includes the releasing sheet of the present invention is used in a printing device, the tape is free from problems such as insufficient feed rate or impracticable tape feeding due to the development of static electricity. Because the antistatic properties of the releasing sheet result from its conductivity, the antistatic effect will be retained, even if the releasing sheet is stored for a long period of time in an extremely high temperature environment or in a low temperature and low humidity environment. A colored layer, such as a white pigment, may be formed between the paper backing and the separation layer so that characters and symbols printed on a transparent film attached to the releasing sheet will be visible against the colored background.

Although the invention has been described with reference to specific embodiments, nothing herein is intended to be in any way limiting. As will be apparent to one of skill in the art, many changes may be made to the above described embodiments without departing from the spirit and scope of the invention, as set forth in the appended claims.

What is claimed is:

1. A tape cassette for holding an elongated recording medium, comprising:

a cassette shell;

a spool that is rotatably mounted on the cassette shell; and an elongated recording medium that is wound around the spool, the elongated recording medium comprising:

a recording layer, an adhesive layer formed on at least one side of the recording layer, and a releasing sheet that is releasably adhered to the adhesive layer, the releasing sheet comprising:

a backing layer that includes an electrically conductive material and has a surface electrical resistance of less than approximately $1.0 \times 10^{12} \Omega$; and a separation layer formed over said backing layer, the separation layer being capable of releasably adhering to an adhesive layer.

2. The tape cassette of claim 1, wherein said conductive material comprises a metal powder.

3. The tape cassette of claim 1, wherein said conductive material comprises conductive carbon black.

4. The tape cassette of claim 1 wherein a colored layer is formed between said backing layer and said separation layer.

5. The tape cassette of claim 4, wherein said colored layer comprises a white pigment.

6. A recording medium, comprising:

an adhesive layer;

a recording layer adhered to a top surface of said adhesive layer; and a releasing sheet releasably adhered to a bottom surface of said adhesive layer, said releasing sheet comprising a backing layer containing conductive material and having a surface electrical resistance of less than approximately $1.0 \times 10^{12} \Omega$, and a separation layer formed over the backing layer and releasably adhered to the bottom surface of the adhesive layer.

7. The releasing sheet of claim 6, wherein a colored layer is formed between said backing layer and said separation layer.

8. The releasing sheet of claim 7, wherein said colored layer comprises a white pigment.

9. An adhesive sheet of claim 6, wherein said backing layer is a paper backing.

10. The releasing sheet of claim 6, wherein said separation layer is a silicone resin.

11. A tape cassette for holding an elongated recording medium, comprising:

a cassette shell;

a first spool rotatably mounted in the cassette shell;

an adhesive tape wound around the first spool, said adhesive tape comprising a double sided adhesive layer and a releasing sheet releasably adhered to a first surface of the double sided adhesive layer, the releasing sheet comprising a backing layer containing an electrically conductive material and having a surface electrical resistance of less than approximately $1.0 \times 10^{12} \Omega$, and a separation material formed over the single layer backing layer and releasably adhered to the first surface of the double sided adhesive layer;

a second spool rotatably mounted on the cassette shell;

a recording layer wound around said second spool; and an alignment member for aligning the adhesive tape with the recording layer so that the recording layer may be adhered to a second surface of the adhesive tape.

12. A releasing sheet, comprising:

a backing layer that includes an electrically conductive material and has a surface electrical resistance of less than approximately $1.0 \times 10^{12} \Omega$; and a separation layer formed over said backing layer, the separation layer being capable of releasably adhering to an adhesive layer.

13. The releasing sheet of claim 12, wherein said conductive material comprises a metal powder.

14. The releasing sheet of claim 13, wherein said conductive material comprises conductive carbon black.

15. The releasing sheet of claim 12, wherein a colored layer is formed between said backing layer and said separation layer.

16. The releasing sheet of claim 15, wherein said colored layer comprises a white pigment.

17. A releasing sheet of claim 12, wherein said single layer backing layer is a paper backing layer.

18. A releasing sheet of claim 12, wherein said separation layer is a silicone resin.

19. A method of forming a releasing sheet, comprising the steps of:

forming a backing layer that includes an electrically conductive material and has a surface electrical resistance of less than approximately $1.0 \times 10^{12} \Omega$; and forming a separation layer over the backing layer, the separation layer being capable of releasably adhering to an adhesive layer.

20. The method of claim 19, further comprising the step of forming a colored layer between the backing layer and the separation layer.

* * * * *